C. KUENTZEL.
TIRE MACHINE.
APPLICATION FILED MAR. 29, 1918.
1,317,374.
Patented Sept. 30, 1919.
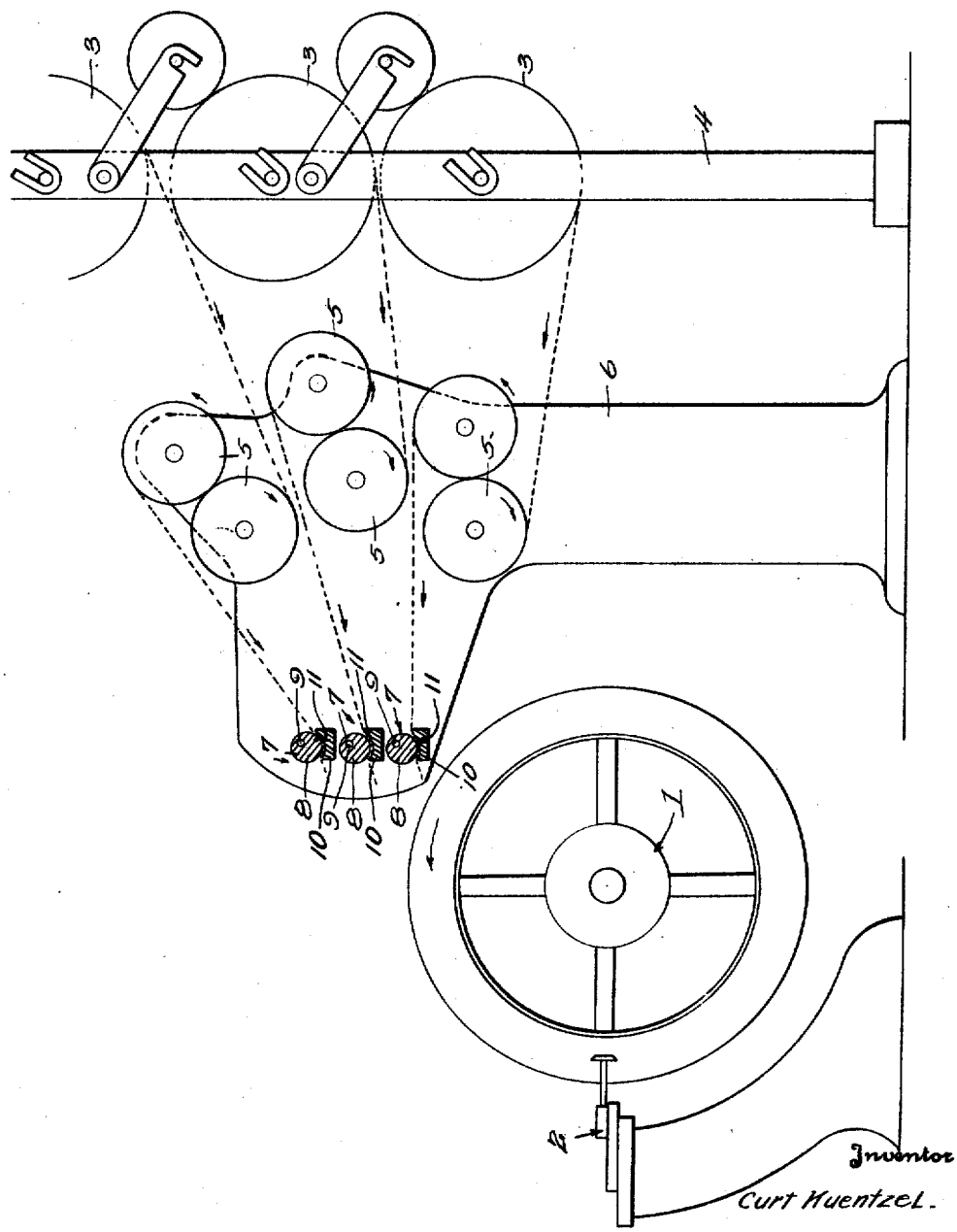
Inventor
Curt Kuentzel.
By C. L. Landon.
his Attorney

UNITED STATES PATENT OFFICE.

CURT KUENTZEL, OF NEW YORK, N. Y., ASSIGNOR TO THE GOODYEAR TIRE & RUBBER COMPANY, OF AKRON, OHIO, A CORPORATION OF OHIO.

TIRE-MACHINE.

1,317,374.  Specification of Letters Patent.  Patented Sept. 30, 1919.

Application filed March 29, 1918. Serial No. 225,490.

*To all whom it may concern:*

Be it known that I, CURT KUENTZEL, a subject of William II, Emperor of Germany, residing in the city, county and State of New York, have invented new and useful Improvements in Tire-Machines, of which the following is a specification.

My present invention relates to improvements in tire machines but more especially to stock regulating and tensioning devices that govern the application of the fabric to the carcass.

In the manufacture of pneumatic tire carcasses upon tire machines, the rubberized fabric of which the carcass is built is carried in any suitable manner upon what is known as the stock rack. From the stock rack it passes over tension rolls or means, to the core upon which it is "laid" and "stitched" down. The tension on the fabric required to build a pneumatic tire is created and maintained by the resistance of the tension rolls and the stretching action of the core in rotating. After the required amount of fabric has been laid on the core, the fabric is severed in proximity to the core and the tension between the stock rolls and the severed end is thereby released.

It will thus readily be seen that upon the application of another layer of fabric to the core a new tension will have to be created and consequently there will be a portion of the fabric on the core which will not be of a uniform tension with the remainder due to the portion of a revolution of the core required to establish this tension.

Being cognizant of the foregoing defects of existing types of fabric tension devices, I have, therefore, had in mind as the principal object of my present invention, the provision of a tension device so constructed that the amount of fabric which must be used to establish the required tension for each new ply of the tire is reduced to a minimum.

Another object of my invention is to produce a mechanism that will quickly release the fabric and grip it at the proper time.

A still further object is to produce a mechanism that can be readily applied to a mechanism that is already in use.

The above and additional objects of a similar nature, which will be hereinafter more specifically treated, may be accomplished by such means as are illustrated in the accompanying drawings, described in the following specification, and then more particularly pointed out in the claims which are appended hereto and form a part of this application.

In the drawing wherein I have diagrammatically illustrated a carcass building machine, the numeral 1 designates the usual chuck and core mounted thereon, 2 the stitcher head, 3 a plurality of stock rolls supported by the standard 4. The tension rolls 5 are shown supported by a suitable standard 6 positioned in a direct line with the line of travel of the fabric.

Mounted also upon the standard 6 and interposed between the tension rolls and the core are a series of eccentric roll units designated as 7 which constitute one embodiment of my invention. The eccentric rolls 8 are rotatably mounted in the frame work 6 by suitable bearings, (not shown) and the trunnions 9 securely fastened in longitudinal bores eccentrically located in the rolls.

Rigidly mounted in the standard 6 and directly beneath each roll is a clamping bar, preferably rectangular in shape, with the exception that their upper faces 11 have a concaved surface eccentric with the rolls and scribed with an arc of the same radius as that of the rolls, the object of which is apparent. While the stock is being fed out to the core, the eccentric rolls are swung out of engagement with the concaved surfaces 11 by the pull of the fabric but when the tension is released on the fabric by severing at the core, the rolls immediately bind the fabric between the rolls and the concaved surfaces of the binding bars.

In use of the device the operator selects the correct fabric from the plurality of rolls 3, attaches the end projecting out from the corresponding eccentric roll 8 to the core periphery and starts the core to rotating. This releases the clamping action of the eccentric roll which allows the correct amount of fabric to pass through at the proper tension. The operator then severs the fabric next to the core whereupon the eccentric roll comes into play again and clamps the fabric until that particular piece of fabric is needed again.

From the foregoing, it will be easily seen that the major portion of the fabric unwound from the stock roll is under the proper tension at all times, a more uniformly tensioned layer is applied to the core, and the establishment of a tension by the rotation of the core is reduced to a minimum.

It will be understood that the movement required of the roll 8 to either release or grip the fabric is very slight.

What I claim is:

1. A tension maintaining device of the character described, comprising a fixed jaw having a longitudinal concaved channel in one face, and over which the fabric is adapted to pass, and a movable jaw mounted for rotation about an eccentric axis, said movable jaw having a portion shaped to mate with and conform to the curvature of the channel in the fixed jaw whereby movement of the fabric between the jaws in one direction is freely permitted but whereby movement of the fabric in opposite direction to the jaws is immediately arrested through the turning of the movable jaw on its axis by the fabric itself and the consequent gripping of the fabric in the channel of the fixed jaw by the mating portion of the movable jaw.

2. In an apparatus of the character described, a tension maintaining device comprising an element having a concaved upper surface, over which fabric under tension is adapted to pass, an element coöperating with said concaved surface and loosely mounted in eccentric relation thereto, whereby fabric is freely drawn in one direction below the eccentric element, but is prevented from moving in the opposite direction by the gripping action of the eccentric element.

3. In an apparatus of the character described, a fabric tension maintaining device comprising a bar having a concaved upper surface over which a fabric strip under tension is adapted to pass, a roll having a surface substantially conforming to the concaved surface of the roll and loosely mounted in eccentric relation thereto, whereby fabric may be freely drawn in one direction between the concaved surface of the bar and the curved surface of the eccentric roll, but is prevented from moving in the opposite direction by the gripping action of the eccentric roll.

In testimony whereof, I have hereunto signed my name in the presence of two subscribing witnesses.

CURT KUENTZEL.

Witnesses:
B. J. McDanel,
E. C. Leadenham.

Copies of this patent may be obtained for five cents each, by addressing the "Commissioner of Patents, Washington, D. C."